(12) United States Patent
Maurer

(10) Patent No.: US 11,557,158 B2
(45) Date of Patent: Jan. 17, 2023

(54) VEHICLE DIAGNOSTIC TESTING SYSTEM

(71) Applicant: Martin Raul Maurer, Winterville, NC (US)

(72) Inventor: Martin Raul Maurer, Winterville, NC (US)

( * ) Notice: Subject to any disclaimer, the term of this patent is extended or adjusted under 35 U.S.C. 154(b) by 242 days.

(21) Appl. No.: 16/778,921

(22) Filed: Jan. 31, 2020

(65) Prior Publication Data

US 2021/0241548 A1   Aug. 5, 2021

(51) Int. Cl.
*G07C 5/08* (2006.01)
*G07C 5/00* (2006.01)
*G06Q 20/10* (2012.01)

(52) U.S. Cl.
CPC .............. *G07C 5/085* (2013.01); *G07C 5/008* (2013.01); *G07C 5/0808* (2013.01); *G06Q 20/10* (2013.01); *G07C 2205/02* (2013.01)

(58) Field of Classification Search
CPC ...... G07C 5/085; G07C 5/008; G07C 5/0808; G07C 2205/02; G06Q 20/10; G07F 17/0014
See application file for complete search history.

(56) References Cited

U.S. PATENT DOCUMENTS

| | | | |
|---|---|---|---|
| 2017/0193716 A1* | 7/2017 | Wittliff, III | B60L 53/305 |
| 2017/0213398 A1* | 7/2017 | Grenn | G05B 15/02 |
| 2019/0118657 A1* | 4/2019 | Wang | B60L 53/39 |

* cited by examiner

*Primary Examiner* — Michael V Kerrigan
(74) *Attorney, Agent, or Firm* — Andrew S. Rapacke

(57) ABSTRACT

A testing system for interfacing with a vehicle diagnostic system and performing a diagnostic test on a vehicle. The testing system includes a housing configured to at least partially retain a processor in circuit communication with test circuitry configured to selectively communicate with vehicle's onboard diagnostic system via a test cable. The test cable retrieves diagnostic data from the onboard diagnostic system, and the processor performs a diagnostic test which is sent to an output device for displaying the test results. Results are transmitted to a computing device comprising an application system having an interpreter for displaying diagnostic data on a display of the computing device.

20 Claims, 3 Drawing Sheets

VEHICLE DIAGNOSTIC TESTING SYSTEM

TECHNICAL FIELD

The embodiments presented relate to electrical testing of vehicle diagnostic systems and, more specifically, to self-service vehicle diagnostic systems.

BACKGROUND

Many vehicles today include an onboard diagnostic system (OBD), which refers to a vehicle's self-diagnostic and reporting capabilities. The OBD system gives the vehicle operator or repair technician access to the status of the various subsystems within the vehicle. Subsystems may include the powertrain control module, engine control module, transmission control module, airbag control module, and anti-lock braking system (ABS) control module. Modern OBD systems use a standardized digital communications port to provide real-time data in addition to a series of diagnostic trouble codes (DTC's) which allow one to identify and remedy malfunctions within the vehicle.

OBD devices are often handheld and can be purchased at automotive stores. Mechanics require large fees for performing the diagnostic to determine the DTC. The operator or repair technician must then look up the code using a reference to determine the source of the DTC. Often, the cause of the DTC is not readily apparent causing further confusion to the user.

In the current arts, OBD devices do not allow for external communication to computing devices. The user must manually search for the DTC and determine the cause of the issue. Further, current OBD devices do not source or recommend appropriate repair personnel for the DTC which has been identified, resulting in a loss of resources and confusion.

SUMMARY OF THE INVENTION

The embodiments disclose a testing system for interfacing with a vehicle diagnostic system and performing a diagnostic test on a vehicle. The testing system comprising a housing which at least partially retains a processor in circuit communication with test circuitry configured to selectively communicate with the vehicle's onboard diagnostic system via a test cable. The test cable retrieves diagnostic data from the onboard diagnostic system, and the processor performs a diagnostic test which is sent to an output device for displaying the test results. Results are transmitted to a computing device comprising an application system having an interpreter for displaying diagnostic data on a display of the computing device.

The system utilizes an onboard diagnostic (OBD) system scan tool which is provided for a fee at a public location such as a gas station, convenience store, automotive repair shop, gas station, automotive parts store, or any other locations which are accessible to a vehicle. The OBD system scan tool will allow the user to interface with, diagnose, reprogram, clear alerts, and otherwise manipulate the various vehicle control modules commonly found in vehicles.

In one aspect, the housing is a waterproof housing provided as a stationary unit at a public location such as a parking lot, automotive retail location, mechanic, gas station, or similar public location.

In one aspect, the housing includes a payment port for accepting payment and transmitting the payment to a payment processing system.

In one aspect, the housing includes a plurality of speakers in communication with the output device to transmit audio instructions. The audio instructions may be accompanied by a tutorial transmitted via a display on the housing.

In one aspect, the test cable is retractable into the housing. The test cable defines a communicable range for the diagnostic test to be performed. In one example, the test cable is about 10 feet long.

In one aspect, a motion sensing module determines the presence of a vehicle and turns the testing system to an ON function.

In one aspect, the processor is configured to clear codes from the onboard diagnostic system to turn off a dashboard indicator light from the vehicle.

BRIEF DESCRIPTION OF THE DRAWINGS

A complete understanding of the embodiments and the advantages and features thereof will be more readily understood by reference to the following detailed description when considered in conjunction with the accompanying drawings wherein.

DETAILED DESCRIPTION

The specific details of the single embodiment or variety of embodiments described herein are set forth in this application. Any specific details of the embodiments are used for demonstration purposes only, and no unnecessary limitation or inferences are to be understood therefrom. It is noted that the embodiments reside primarily in combinations of components related to the system and method of use thereof.

The present embodiments are based in part upon an onboard diagnostic (OBD) system scan tool which is provided for a fee at a public location such as a gas station, convenience store, automotive repair shop, gas station, automotive parts store, or any other locations which are accessible to a vehicle. The OBD system scan tool will allow the user to interface with, diagnose, reprogram, clear alerts, and otherwise manipulate the various vehicle control modules commonly found in vehicles.

Figure 1:
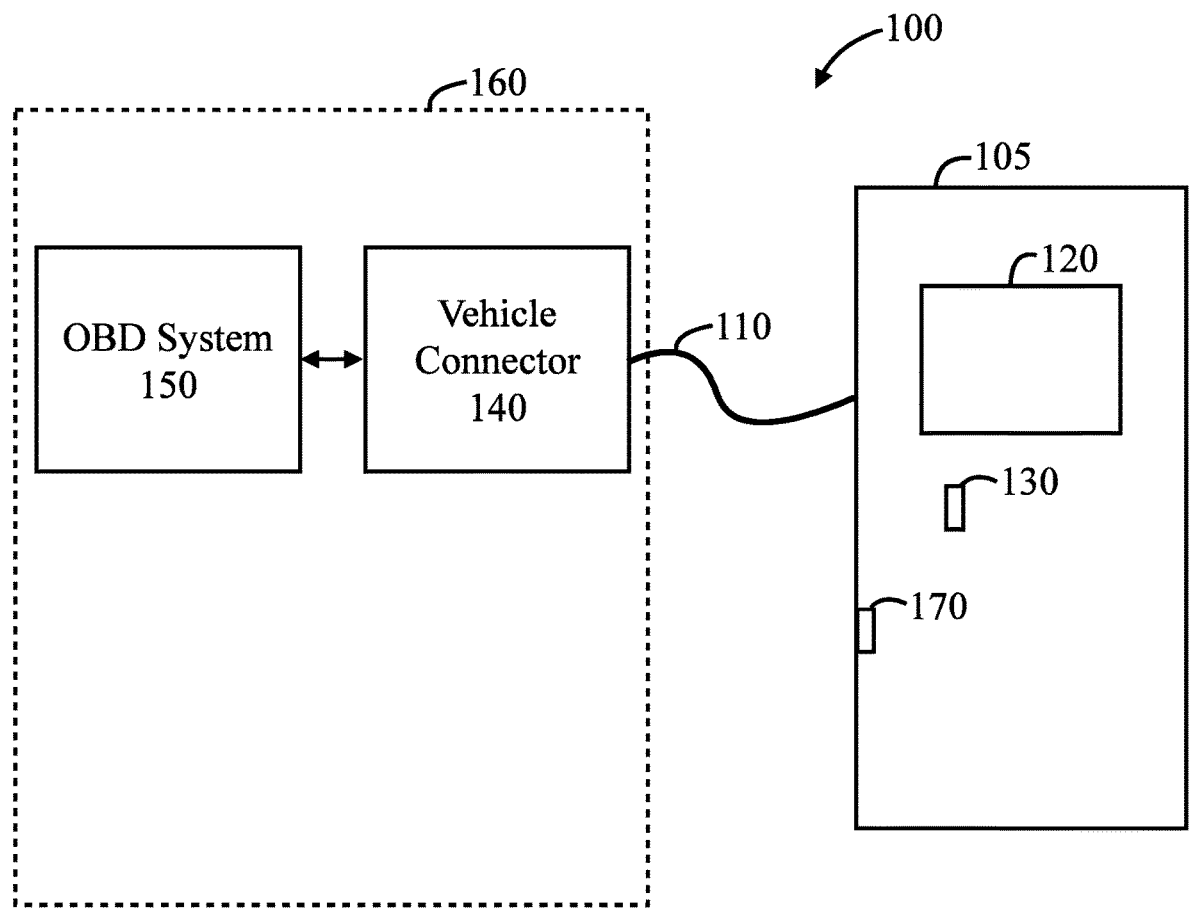
FIG. 1 illustrates a schematic of the vehicle diagnostic testing system, according to some embodiments.

FIG. 1 illustrates an exemplary testing system 100 for retrieving data from a vehicle 160 onboard diagnostic system 150. The testing system 100 includes a housing 105 positioned to connect, via a test cable 110, to the vehicle 160 to allow for a diagnostic test to be performed. The testing system 100 is configured to retrieve vehicle 160 data and is provided as a stand-alone scan tool wherein the additional information may be obtained for a print out, for storing the obtained data or comparing data, such as the VIN number of the vehicle to the VIN number stored in the vehicle diagnostic system. The testing system 100 includes a test cable 110 having a connector as known in the arts. The connector may be a Data Link Connector (DLC), such as a J1692 connector. The test cable 110 connector is connectable to vehicle onboard diagnostic connector 140. The housing 105 may be further comprised of a payment port 130 which may accept cash, credit/debit cards, or other forms of payment.

In some embodiments, the test cable 110 is retractable into the housing 105. The test cable 110 may have a length of about 10 feet to allow for connection to the vehicle.

When connected to the vehicle's 160 onboard diagnostic system 150, the testing system 100 establishes a communications link with the onboard diagnostic system 150 utilizing any interface method known in the arts.

Upon establishing a communications link, the testing system 100 can retrieve data, including, for example, information or DTCs from the vehicle diagnostic system and provide an output to the I/O device 120. The output can be to the I/O device 120, a printer (not shown), a remote computer (not shown), or stored in internal memory for later use.

In some embodiments, the housing 105 may also include one or more sensor(s) 170 to sense the presence of a vehicle near the housing. For example, the sensor 170 may sense an approach of a vehicle to the housing and automatically actuate various processes of the system, such as the activation of the user I/O device 120 and associated user interface, the extraction of the test cable 110, or the initiation of the payment port 130.

In some embodiments, the sensor(s) 170 may include motion sensors such as active infrared sensors, passive infrared sensors, combined motion sensors, ultrasonic sensors, and other motion sensors known in the arts. Similarly, proximity sensors, tactile sensors, microphones, or other visual and audible sensors may be implemented.

In some embodiments, the I/O device displays a user interface to permit the user to select from various functional options of the system including types of vehicle diagnostic tests, types of or number of vehicle(s) to be tested, payment options, and the like.

Figure 2:
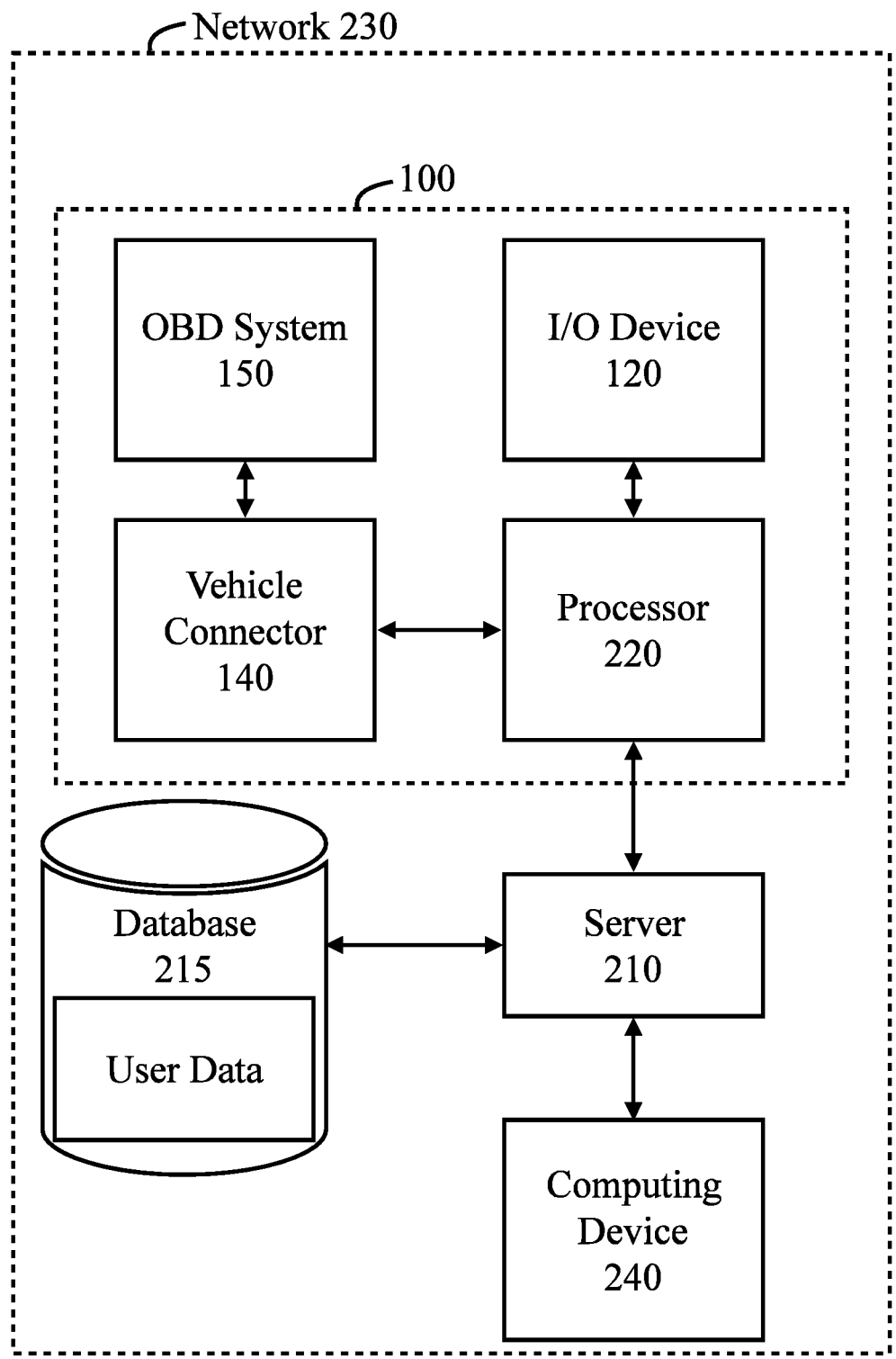
FIG. 2 illustrates a block diagram of the vehicle diagnostic testing system infrastructure, according to some embodiments.

FIG. 2 illustrates a block diagram of the system infrastructure 100. The processor 220 may be one of virtually any number of processor systems and/or stand-alone processors, such as microprocessors, microcontrollers, and digital signal processors, and has associated therewith, either internally therein or externally in circuit communication therewith, associated RAM, ROM, EPROM, flash memory, clocks, decoders, memory controllers, and/or interrupt controllers, etc. known to those in the art to be needed to implement a processor circuit.

The processor 220 typically executes a computer program, code or logic, stored in its RAM, ROM, its EPROM and/or flash memory using data stored in any one or more of those memories. For example, the processor 220 may execute a computer program from a ROM using data (e.g., codes) stored in flash memory. In general, the computer program executed by the processor 220 initializes the testing system 100 and generates a user interface, for example, using the I/O device 120 through which a user causes the testing system 100 to communicate with the vehicle's onboard diagnostic system 150 to read certain data from the vehicle onboard diagnostic system 150, format such read data, and display the formatted data on the I/O device 120 or communicate the data to a remote computing device 240 via a network 230. The remote computing device 240 may include a smartphone, tablet, desktop computer or similar computing device. In some embodiments, a server 210 sends and receives data from a database 215. The database may include a cloud-based database to store the vehicle, user, or system data.

Processors 220 suitable for the execution of a computer program include both general and special purpose microprocessors and any one or more processors 220 of any digital computing device. The processor 220 will receive instructions and data from a read-only memory or a random-access memory or both. The essential elements of a computing device are a processor for performing actions in accordance with instructions and one or more memory devices for storing instructions and data. Generally, a computing device will also include, or be operatively coupled to receive data from or transfer data to, or both, one or more mass storage devices for storing data, e.g., magnetic, magneto-optical disks, or optical disks; however, a computing device need not have such devices. Moreover, a computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

The vehicle connector 140 and testing system 100 are used to facilitate generating one or more communications protocols with which the testing system 100 and the onboard diagnostic system 150 communicate with one another.

Figure 3:
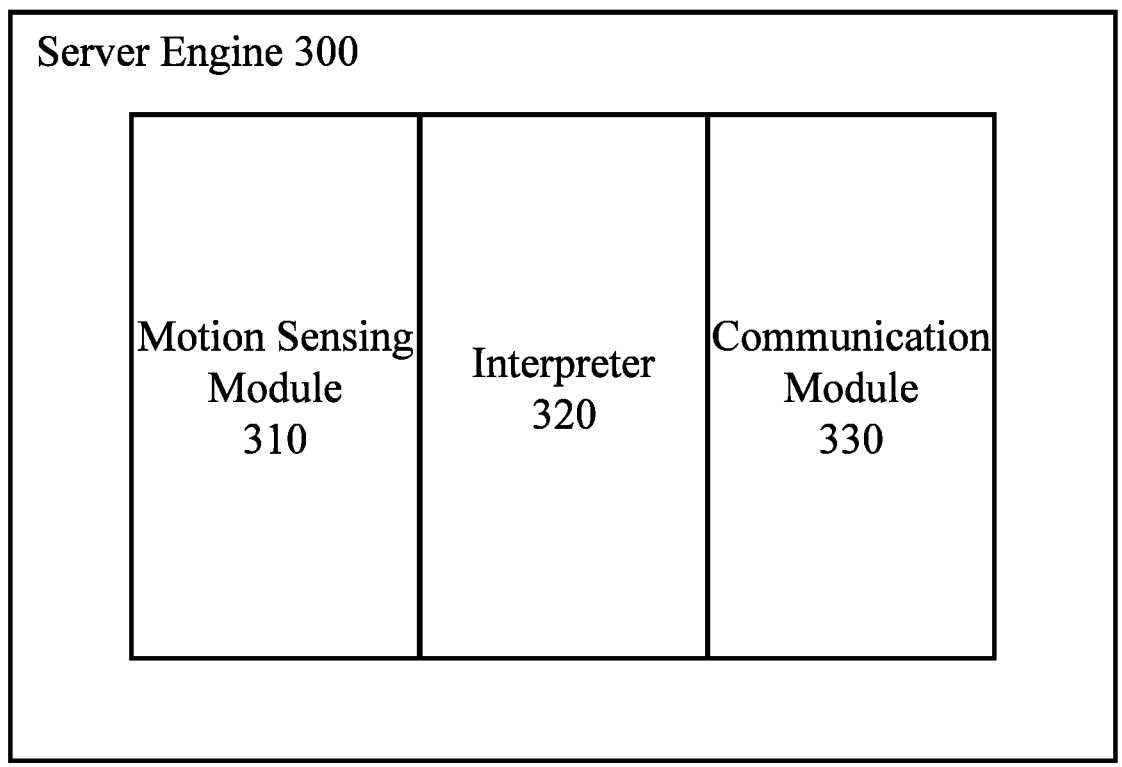
FIG. 3 illustrates a block diagram of the server and modules for the vehicle diagnostic testing system, according to some embodiments.

FIG. 3 illustrates the server engine 300 and various modules in operable communication with the testing system 100. In some embodiments, the housing includes a motion sensor to sense the presence of a vehicle within a communicable range of the housing. The communicable range may be defined as the length of the test cable which connects to the vehicle during a diagnostic test. A motion sensing module 310 is in communication with the motion sensor which turns the testing system to an ON function while the vehicle is within the communicable range. Following the reception of the vehicle data, an interpreter 320 interprets the vehicle code and transmits the output to the I/O device. A communications module 330 may transmit test results or other communications to the I/O device or the remote computing device. The communications module 330 may also transmit signals to the vehicle onboard diagnostic system to remove codes causing a dashboard alert.

In some embodiments, the interpreter 320 may provide a suggestion for a protocol for fixing a vehicle problem indicated by the testing system. For example, the interpreter 320 may identify that the testing system is issuing a diagnostic code for an oxygen sensor malfunction. The interpreter 320 then transmits a protocol for removing the current oxygen sensor and inputting a new sensor into the vehicle.

In some embodiments, the testing system includes a wireless scanner to wirelessly scan the diagnostic code output by the OBD system of the vehicle.

In some embodiments, the testing system utilizes near-frequency communication (NFC) protocols to communicate with a computing device, such as a smartphone, associated with the user.

In some embodiments, the testing system is WiFi enabled to permit the testing system to communicate with the web-enabled systems. A network interface may be configured to allow data to be exchanged between the testing system and other devices attached to a network, such as other computer systems, or between nodes of a computer system. In various embodiments, the network interface may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

Many different embodiments have been disclosed herein, in connection with the above description. It will be understood that it would be unduly repetitious and obfuscating to literally describe every combination and subcombination of these embodiments. Accordingly, all embodiments can be combined in any way and/or combination, and the present specification, shall be construed to constitute a complete written description of all combinations and subcombinations of the embodiments described herein, and of the manner and process of making and using them, and shall support claims to any such combination or subcombination.

It will be appreciated by persons skilled in the art that the present embodiment is not limited to what has been particularly described hereinabove. A variety of modifications and variations are possible in light of the above teachings without departing from the following claims.

What is claimed is:

1. A testing system for interfacing with a vehicle diagnostic system and performing a diagnostic test on a vehicle, the testing system comprising:
   a housing configured to at least partially retain a processor in circuit communication with test circuitry configured to selectively communicate with vehicle's onboard diagnostic system via a test cable configured to retrieve diagnostic data from the onboard diagnostic system, the processor configured to perform a diagnostic test;
   an output device for displaying results of the diagnostic test;
   a transmitter for transmitting the results to a computing device comprising an application system having an interpreter for displaying diagnostic data on a display of the computing device; and
   a payment port for accepting payment that is automatically initiated upon approach of a sensed vehicle.

2. The system of claim 1, wherein the housing is a waterproof housing, and wherein the housing is stationary.

3. The system of claim 2, wherein the payment port transmits a payment to a payment processing system.

4. The system of claim 2, wherein the diagnostic test is performed wirelessly.

5. The system of claim 4, wherein the output device is configured to transmit a tutorial via the display and a plurality of speakers.

6. The system of claim 1, wherein the test cable is retractable into the housing.

7. The system of claim 1, further comprising a motion sensor module to determine presence of a vehicle, wherein presence of a vehicle turns the testing system to an ON function.

8. The system of claim 1, wherein the processor is configured to clear codes from the onboard diagnostic system to turn off a dashboard indicator light from the vehicle.

9. A testing system for interfacing with a vehicle diagnostic system and performing a diagnostic test on a vehicle, the testing system comprising:
   a housing configured to at least partially retain:
      a processor in circuit communication with a test circuitry configured to selectively communicate with the vehicle's onboard diagnostic system via a retractable test cable configured to retrieve diagnostic data from the onboard diagnostic system, the processor configured to perform a diagnostic test and transmit the results of the test to an output device wherein the results of the test are displayed, the processor configured to transmit a diagnostic test protocol to a plurality of speakers and a display of the output device;
   a transmitter for transmitting the results to a computing device comprising an application system having an interpreter for displaying diagnostic data on a display of the computing device; and
   a payment port for accepting payment that is automatically initiated upon approach of a sensed vehicle.

10. The system of claim 9, further comprising a database in communication with the processor via a server to store diagnostic, user, and repair service data.

11. The system of claim 10, wherein the test results are transmitted to a repair service system to source a repair location.

12. The system of claim 9, further comprising a motion sensor module to determine the presence of a vehicle, wherein the presence of the vehicle turns the testing system to an ON function.

13. A testing system for interfacing with a vehicle diagnostic system and performing a diagnostic test on a vehicle, the testing system comprising:
   a housing configured to at least partially retain:
      a processor in circuit communication with a test circuitry configured to selectively communicate with the vehicle's onboard diagnostic system via a retractable test cable configured to retrieve diagnostic data from the onboard diagnostic system, the processor configured to perform a diagnostic test and transmit the results of the test to an output device wherein the results of the test are displayed, the processor configured to transmit a diagnostic test protocol to a plurality of speakers and a user interface of the output device;
      one or more sensors to indicate the presence of a vehicle near the housing via a motion sensing module; and
      a transmitter for transmitting the results to a computing device comprising an application system having an interpreter for displaying diagnostic data on a display of the computing device,
      wherein a payment port for accepting payment is automatically initiated upon approach of the vehicle.

14. The system of claim 13, further comprising a database in communication with the processor via a server to store diagnostic, user, and repair service data.

15. The system of claim 14, wherein the database is configured to store user data comprising: a vehicle make, a vehicle model, a vehicle year, and a vehicle diagnostic history.

16. The system of claim 13, wherein the test results are transmitted to a repair service system to source a repair location.

17. The system of claim 13, wherein the motion sensing module is configured to determine presence of a vehicle, wherein presence of a vehicle turns the testing system to an ON function.

18. The system of claim 13, wherein the motion sensing module initiates one or more functions of the testing system.

19. The system of claim 18, wherein the interpreter is configured to suggest a protocol for fixing a vehicle problem.

20. The system of claim 19, wherein a communication module provides a means for a user to communicate with a mechanic.

* * * * *